May 30, 1950 L. C. KALFF ET AL 2,509,508

CABINET STRUCTURE FOR TELEVISION RECEIVERS

Filed Oct. 19, 1946

INVENTORS
LOUIS CHRISTIAAN KALFF
CORNELIS HENDRIK MOREL
GERRIT JAN SIEZEN
BY Fred M Vogel
AGENT Patented May 30, 1950

2,509,508

UNITED STATES PATENT OFFICE 2,509,508

CABINET STRUCTURE FOR TELEVISION RECEIVERS

Louis Christiaan Kalff, Cornelis Hendrik Morel, and Gerrit Jan Siezen, Eindhoven, Netherlands, assignors to Hartford National Bank and Trust Company, Hartford, Conn., trustee Application October 19, 1946, Serial No. 704,340
In the Netherlands July 11, 1945

Section 1, Public Law 690, August 8, 1946
Patent expires July 11, 1965

4 Claims. (Cl. 88—24)

In television receivers of the so-called projection type the reproduced television image formed, for example, on the luminous screen of a cathode-ray tube of small size but of great light intensity is projected on a substantially vertical screen by means of an optical system. This screen may be either transparent, for example of frosted glass, or opaque and may be diffusely reflecting.

In the latter case the image is projected onto the front of the screen so that the optical projection system is required to be located in front of the screen. This involves difficulty in the construction of apparatus housed in a cabinet in which the screen is provided on the inside of the lid, since for the purpose of avoiding excessive angles of image (i. e. maximum angle between projected rays) there must be a comparatively great distance between the optical system and the screen. In order to avoid a great depth of the cabinet, the image is generally projected on the screen via a plane mirror which, as the case may be, is capable of being slid forward out of the cabinet, with the result that the space occupied by the path of rays may be reduced to half.

Besides a small depth of the cabinet as small as possible a height of the cabinet is also of importance for apparatus which in the operating position stand on the ground (console-model). This height is determined by the fact that the screen must be located at the height of the eyes of a sitting person, which implies in practice that the cabinet must become higher and more expensive than is necessary for the apparatus to be housed, whilst also from an aesthetic point of view a comparatively low cabinet is preferable.

According to the invention, the lowest possible height of the cabinet is obtained by that the screen being hinged on or slidably mounted in the lid of the cabinet, and in the operating position for television reception is located above the opened lid of the cabinet and substantially in line with it.

This may be realised in a highly satisfactory manner if the plane mirror is capable of being hinged out or slid out so as to be substantially above the cabinet in the outward position.

The invention will be explained more fully by reference to the accompanying drawing showing, by way of example, two embodiments thereof.

Figure 1:
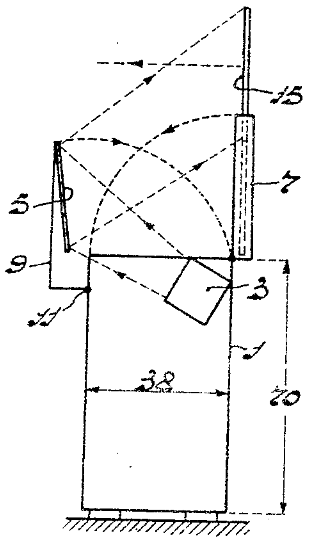

Figure 1 shows diagrammatically a television receiver housed in a cabinet 1, which in the operating position stands on the ground (so-called console-model). The cabinet 1 contains a projection apparatus 3 comprising an image reproducer, for example a cathode-ray tube, and an optical projection system. The reproduced image is projected on a screen 15 via a plane mirror 5, said screen being arranged on the hinged lid 7 of the cabinet 1.

The mirror 5 is arranged in a hinged part 9 of the cabinet 1. The part 9 can be hinged by 90° about a horizontal spindle 11 located in the front of the cabinet, and is shown in the drawing in its outward position in which it projects from the front wall of the cabinet 1.

Figure 2:
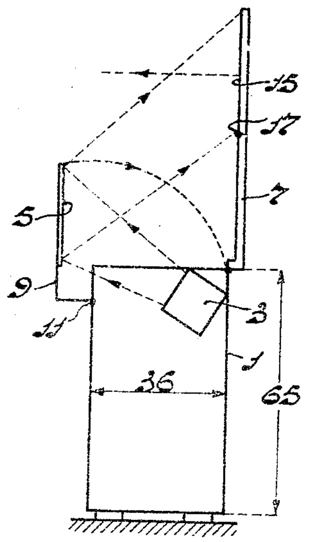

The screen 15 must be located at the height of the eyes of a sitting person. On the other hand, the cabinet must preferably have a fairly small height, which is desirable particularly for apparatus intended for use in an ordinary living-room. According to the invention, in the manner shown in the drawing the screen 15 is arranged to be either capable of being slid out (Figure 1) or hinged out (Figure 2) with respect to the lid 7. In the operating position for television reception the screen 15 is located above the lid 7 and substantially in line with it, whereas when the apparatus is not in use or when used as a radio-receiver the screen is either pushed into the cover, or reversed about a horizontal hinge 17 against the inside of the lid.

The foregoing may be realised in a highly satisfactory manner if the hinged mirror 5 in its outward position is substantially above the cabinet such as shown in the drawing. It is thus ensured that the beam of rays is not unduly inclined with respect to the screen even when the screen 5 is slid out far above the cabinet. To demonstrate the small dimensions obtainable for the cabinet, we have marked them in the figures (in cms.).

What we claim is:

1. A cabinet structure for viewing electro-optical images produced by a projection apparatus positioned internally of said cabinet structure, comprising a main cabinet section having a sidewall, a cover member having a position closing said cabinet structure and an open position extending substantially vertically above said sidewall at the rear of said cabinet, an opaque viewing screen carried by said cover member and having an operable position extending above and substantially in line with said cover member and facing forwardly in its open position, said screen having an inoperable position being enclosed within said cabinet structure with said cover member in its closed position, a second member mounted at the front of said cabinet, means for permitting movement of said second member from a position substantially over the top of said cabinet to a position extending substantially vertically above said sidewall, a mirror mounted on said second member, said mirror being located on said second member to face said viewing screen when said screen is in said operable position and said second member is in said vertically extended position whereby an image formed by the projection apparatus is reflected from said mirror onto said viewing screen in the operable positions thereof.

2. A cabinet structure for viewing electro-optical images produced by a projecting apparatus positioned internally of said cabinet structure, comprising a main cabinet section having opposite sidewalls, a front wall and a rear wall, a cover member mounted on said rear wall and having a position closing said cabinet structure and an open position extending substantially vertically above said rear wall, an opaque viewing screen carried by said cover member and having an operable position and an inoperable position, said screen in its operable position having a viewing surface extending vertically above the uppermost portion of said cover member in its open position and facing forwardly, a substantially plane mirror having an operable position above the said front wall and facing rearwardly and having an inoperable position adjacent the upper limits of said walls, said screen and said mirror in the inoperable positions thereof being enclosed within said cabinet structure with said cover member in its closed position, whereby with said viewing screen and said mirror in the operable positions thereof, light rays projected from said projection apparatus may be reflected from said mirror onto said viewing screen.

3. A cabinet structure for viewing electro-optical images produced by a projection apparatus positioned internally of said cabinet structure, comprising a main cabinet section having a rear wall, a cover member hinged on said rear wall having a position closing said cabinet structure and having an open position extending substantially vertically above said rear wall, an opaque viewing screen carried by said cover member and having an operable position extending above and substantially in line with said cover member in its open position and facing forwardly, said screen having an inoperable position in which said screen is slidably enclosed within said cover member, a second member mounted at the front of said cabinet, means for permitting movement of said second member from a position substantially over the top of said cabinet to a position extending substantially vertically above said front of said cabinet, a mirror mounted on said second member, said mirror being located on said second member to face said viewing screen when said screen is in said operable position and said second member is in said vertically extended position, whereby an image formed by the projection apparatus is reflected from said mirror onto said viewing screen in the operable positions thereof.

4. A cabinet structure for viewing electro-optical images produced by a projecting apparatus positioned internally of said cabinet structure, comprising a main cabinet section having a rear wall, a cover member hinged on said rear wall and having a position closing said cabinet structure and an open position extending substantially vertically above said rear wall, an opaque viewing screen hinged on said cover member at the portion thereof most remote from the portion of said cover member hinged to said sidewall and having an open position extending above and substantially in line with said cover member in its open position and facing forwardly, said screen having an inoperable position against the internal portion of said cover member in its closed position, a second member mounted at the front of said cabinet structure, means for permitting movement of said second member from a position substantially over the top of said cabinet structure to a position extending substantially vertically above said front of said cabinet structure, a mirror mounted on said second member, said mirror being located on said second member to face said viewing screen when said screen is in said operable position and said second member is in said vertically extended position, whereby an image formed by the projection apparatus is reflected from said mirror onto said viewing screen in the operable positions thereof.

LOUIS CHRISTIAAN KALFF.
CORNELIS HENDRIK MOREL.
GERRIT JAN SIEZEN.

REFERENCES CITED

The following references are of record in the file of this patent:

UNITED STATES PATENTS

| Number | Name | Date |
|---|---|---|
| 2,022,903 | Thomas | Dec. 3, 1935 |
| 2,122,969 | Whitcomb | July 5, 1938 |
| 2,224,020 | Jones et al. | Dec. 3, 1940 |
| 2,404,943 | Beshgetoor | July 30, 1946 |
| 2,431,830 | Rose | Dec. 2, 1947 |

FOREIGN PATENTS

| Number | Country | Date |
|---|---|---|
| 436,301 | Great Britain | Oct. 9, 1935 |
| 477,814 | Great Britain | Jan. 6, 1938 |